United States Patent [19]

Cummins

[11] 4,189,284
[45] Feb. 19, 1980

[54] SLIPPING CLUTCH MECHANISM

[75] Inventor: Kevin T. Cummins, Eltham, Australia

[73] Assignee: Zardana Corporation N.V., Curacao, Netherlands

[21] Appl. No.: 872,453

[22] Filed: Jan. 26, 1978

[51] Int. Cl.² .................................................. F04B 39/00
[52] U.S. Cl. .................................. 417/313; 192/67 R; 192/89 B
[58] Field of Search ............... 417/423 R, 423 A, 424, 417/313, 319; 415/123; 192/89 B, 67 R

[56] References Cited

U.S. PATENT DOCUMENTS

| | | | |
|---|---|---|---|
| 2,611,283 | 9/1952 | Askren et al. | 192/67 R X |
| 3,640,363 | 2/1972 | Spalding | 192/89 B X |
| 4,120,615 | 10/1978 | Keem et al. | 417/423 R X |
| 4,123,197 | 10/1978 | Keem et al. | 417/423 R X |

FOREIGN PATENT DOCUMENTS

459701  4/1971  Australia ................................ 417/234

Primary Examiner—Carlton R. Croyle
Assistant Examiner—Edward Look
Attorney, Agent, or Firm—Fitch, Even & Tabin

[57] ABSTRACT

A fan having an air directing grille mounted in the path of air flow includes means for rotating the grille at a speed slower than the speed of rotation of the fan blade. The means for rotation also includes a clutch mechanism having a rotary drive member connected to a drive shaft, a driven member coaxially mounted on the drive shaft in a rotatably free manner, and resilient means in between the drive member and the driven member to engage both and rotate the members together. The resilient means includes a provision to slip the engagement and to permit the rotary drive member to rotate without imparting rotational movement to the driven member when a predetermined restraint of rotation is applied to the driven member.

8 Claims, 4 Drawing Figures

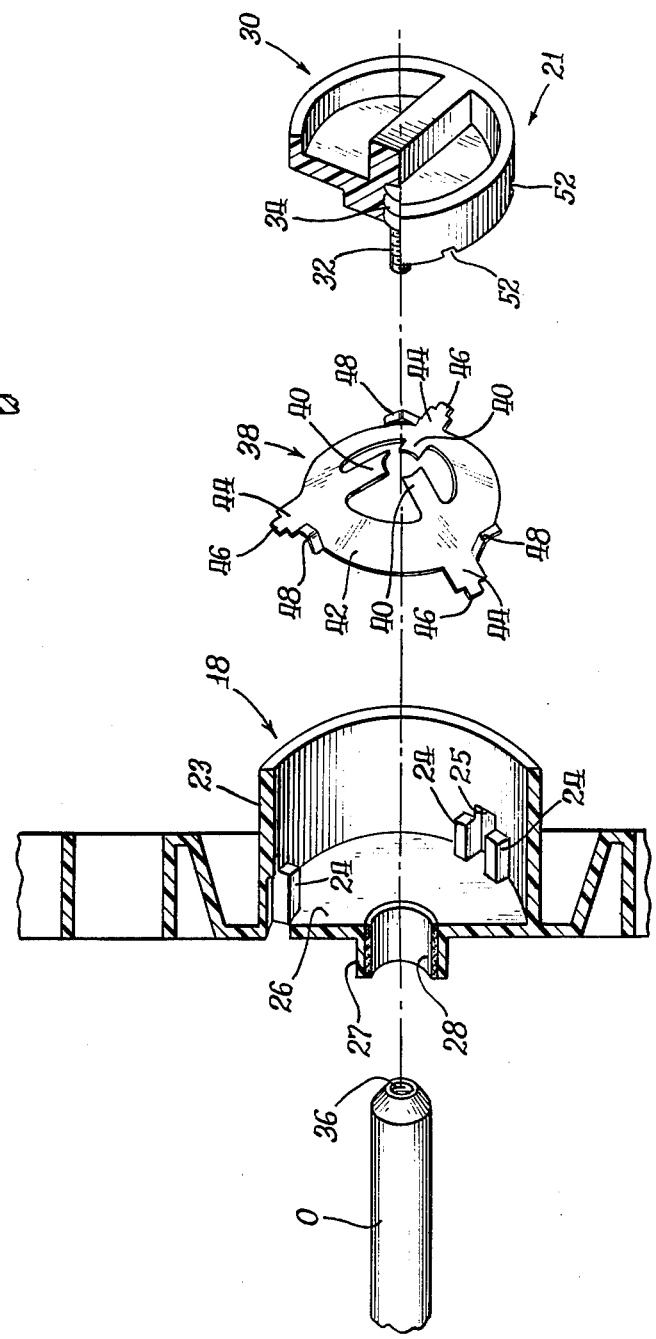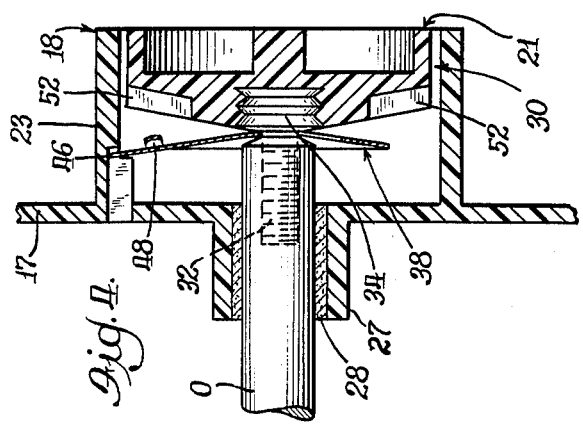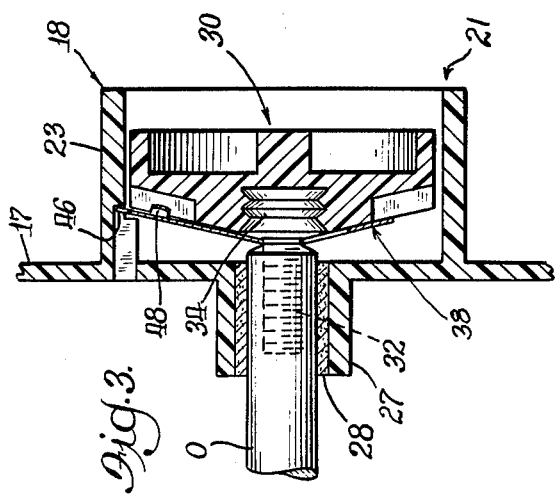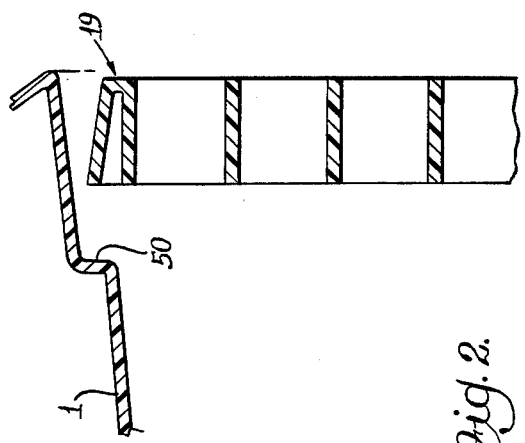

SLIPPING CLUTCH MECHANISM

This invention relates to a slipping clutch mechanism suitable for use in stationary head fans which provide a gyratory distribution pattern of air flow.

In Australian Pat. No. 459,701, there is described and claimed a fan in which the fan head remains stationary, but which is capable of delivering air in a substantially gyratory distribution pattern. The term "gyratory distribution pattern" is intended to indicate an air flow distribution pattern which is substantially the same as that produced by a fan employing a mechanism for mechanically moving the fan and motor assembly in an oscillatory or gyratory manner, except that the flow is more laminar and less helical. The fan described in this Australian patent is broadly defined as comprising a fan blade assembly, an electric motor for driving the fan blade assembly, means to render the air flow from the blade assembly wholly axial, and an air directing grille mounted in the path of the flow of air from the blade assembly and the axial air flow means and driven by the motor to rotate at a speed less than the blade assembly speed, the grille including a plurality of louvers arranged parallel to and at different acute angles to the flow of air such that the air flow is directed by the grille in a substantially gyratory distribution pattern.

The fan particularly described in this Australian patent includes a clutch mechanism which operates to disconnect the drive to the grille in the event that rotation of the grille is obstructed. The mechanism so described comprises three spring steel leaf springs which extend rearwardly from equal angularly disposed locations at the rear of a central hub incorporated into the grille. The grille, and thus the hub, also are mounted for movement coaxially of a drive shaft of the electric motor for the fan. The drive shaft is fitted with a coaxial clutch ring and the grille is mounted such that it can be moved from a forward non-driving disposition, at which free rear ends of the springs are forwardly disposed of and clear from the clutch ring, to a rearward location to engage rotary drive motion to the grille. During this rearward movement, the free ends of the springs initially engage a peripheral, sloping, cam surface on the forward end of the clutch ring to force the free ends radially apart. During further rearward movement, the free ends ride over this cam surface to be engaged in a peripheral annular groove on the clutch ring. The groove is sinuously configured at its root so as to define a plurality of radially inwardly extending notches therein, these notches being equally spaced around the axis of the drive shaft and being separated by radially outwardly extending crests in the root. The free rear ends of the springs enter appropriately positioned ones of these notches and so key the hub and clutch ring together to rotate the grille together with the drive shaft. In the event that rotation of the grille is obstructed while the clutch mechanism is so engaged, the drive shaft can still continue to rotate without transmitting excessive driving force to the grille, the free ends of the springs merely being repetitively forced outwardly against the resilient bias thereof by camming action as the free ends are engaged by successive crests of the groove root.

While this clutch mechanism is quite satisfactory in use, it does suffer the disadvantage of being relatively complex in construction, and for an item intended to be mass-produced, there is an undesirable labor cost introduced into the overall price of the fans by the assembly operations of the clutch. In particular, the assembly of the clutch mechanism requires: (1) the leaf springs be individually screwed onto the hub; (2) the clutch ring be assembled onto the motor drive shaft; (3) the hub be located in position to extend coaxially of the drive shaft with the free end portions of the springs fitted into the notches of the grooves of the clutch ring; and (4) a screw be inserted through an opening in a transverse wall of the hub to extend into a threaded bore in the shaft to prevent the grille from leaving the shaft under forward pressure of air displaced by the fan. It will be appreciated that these assembly operations are difficult to automate.

Moreover, the mechanism described in the Australian patent may occasionally fail by virtue of the working loose of a screw holding the hub to the shaft, and while this difficulty may be avoided by routine inspection, the arrangement is not fully satisfactory.

It is desirable, therefore, to provide a clutch mechanism particularly, though not exclusively, for use in a fan of the type described in Australian Pat. No. 459,701, and yet which is of relatively simple construction and more adaptable to mass production techniques.

It has been proposed to provide a drive transfer element of the clutch in the form of a helical spring that would be coaxially mounted over the drive shaft for the grille whereby the inner surface portion of the spring element would frictionally engage the outer surface of the shaft for transferring rotational movement of the shaft to the spring. The helical spring would have an end portion which would extend radially outwardly of the axis of the shaft. The hub of the grille would then have an abutment positioned to be engaged by this end portion of the spring during rotation of the drive shaft and the spring to cause, or permit rotation of the hub and grille therewith. The frictional coupling between the spring and the drive shaft would be such as to permit the drive shaft to rotate in the normal direction of rotation of the grille without imparting rotational movement to the spring when a predetermined restraint of rotation of the grille would be applied to the grille. This normal direction of rotation would be a direction tending to unwind the helical spring when the grille is obstructed from rotation. When the shaft would rotate in this preferred direction and the grille would be held against rotation, pressure at the end portion of the spring against the abutment due to rotation of the drive shaft would loosen the coupling between the spring and the drive shaft and partly unwind the spring. This would permit the drive shaft to maintain rotation without rotating the spring. The extending arm of the spring would also be resilient, whereby, when the grille would be held stationary and the drive shaft would be rotated in a second direction tending to wind up the spring and increase the frictional coupling between the spring and the shaft, the end portion of the spring would resiliently deform to pass the abutment on the hub of the grille to permit continued rotation of the shaft. This action also would occur where, for example, the grille would be caused to rotate more quickly than the drive shaft.

Preferably, the drive shaft would also include a groove into which at least one of the convolutions of the helical spring would at least partially engage to restrict axial movement of the spring relative to the shaft. Under this proposal, the grille also would be movable axially of the drive shaft and the fan would have an annular casing portion which would be engageable by an outer annular portion of the grille when the hub would be axially moved in the direction that would free the clutch mechanism from driving the grille. Releasable locking means would be provided that would be operable to maintain the annular portion of the casing so engaged to apply at least the predetermined restraint against the grille whereby the drive shaft would tend to unwind the convolutions of the spring and permit locking of the grille without switching off the motor.

While such mechanisms in the various forms have been developed or proposed, it is an object of this invention to provide and improved slipping clutch mechanism which is useful particularly for a fan, is economical to manufacture, is easy to install during construction stages of the article in which it is to be employed, and which enhances the overall operation of the article in which it is employed.

Other objects of the invention will become apparent and the invention readily understood from the following description read in connection with the accompanying drawing in which:

FIG. 2 is an exploded fragmentary axial section of part of the fan of FIG. 1 showing details of the clutch mechanism incorporated therein;

FIG. 3 is a vertical axial section of a portion of the fan of FIG. 1 illustrating the clutch in the rotatably engaged position; and FIG. 4 is a vertical axial section of a portion of the fan of FIG. 1 illustrating the clutch in the rotatably disengaged position.

Figure 1:
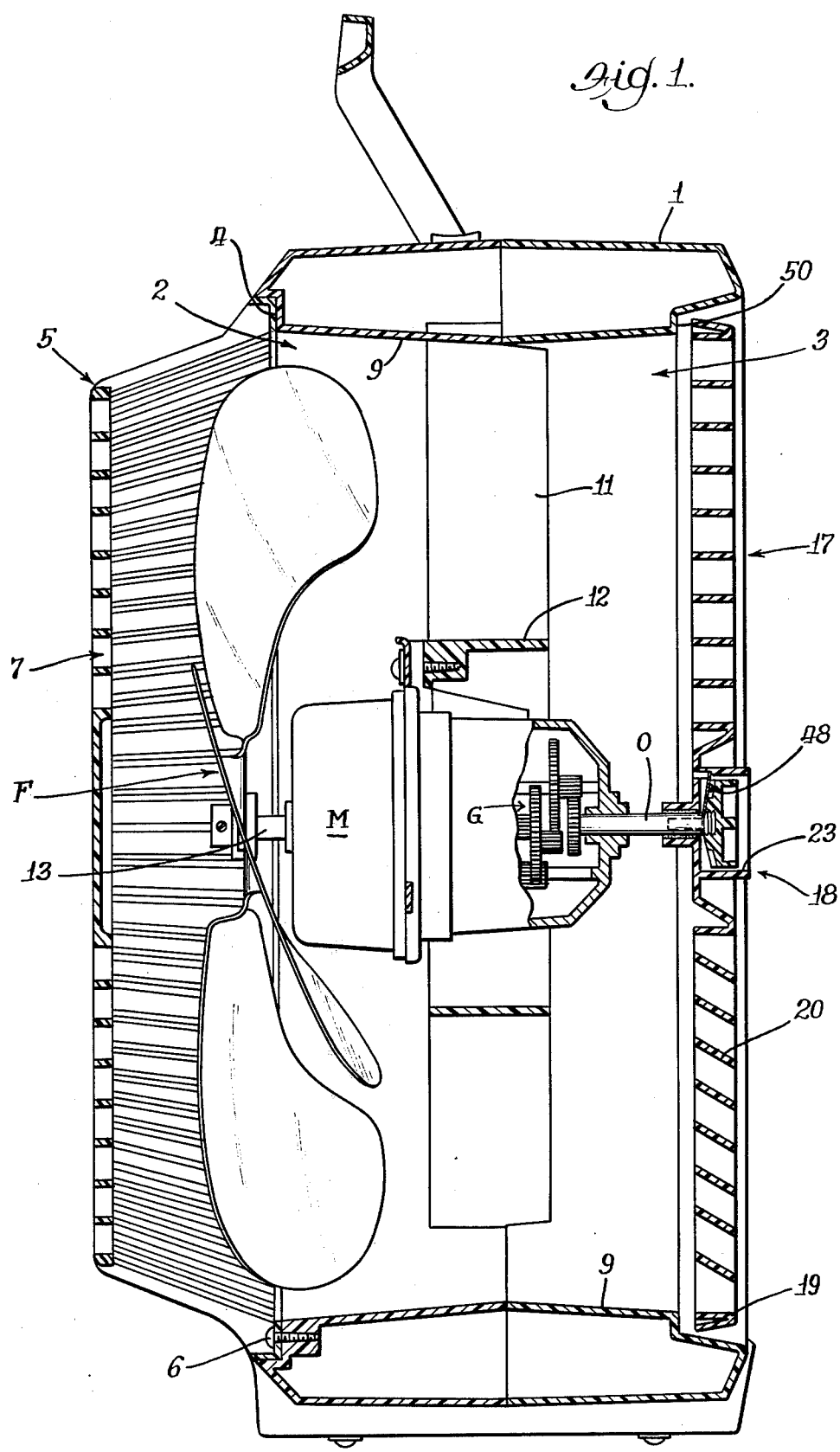
FIG. 1 is a vertical axial section of a fan incorporating a clutch mechanism constructed in accordance with the invention.

The fan shown in the drawings includes a two-part molded plastic casing 1 having a passage defined by an inner wall 9 therethrough communicating with an air inlet opening 2 at the rear face of the casing and an air outlet opening 3 at the front face of the casing. The casing is formed with an annular recess 4 surrounding the inlet opening 2, and this receives the base of a molded plastic cage 5 which is held to the casing by screws 6, the cage 5 having a plurality of air intake openings 7 therethrough. A motor M for the fan is supported within the passage inner wall 9, being fixed to a plastic surround 12 carried by radial veins 11 extending between the surround and the passage inner wall 9. Motor M has an output shaft 13 extending from either end thereof and the end directed towards the inlet 2 supports a fan blade assembly F.

The other end output shaft is connected to a reduction gear box G enclosed within the motor body and having a coaxial output shaft O. The output shaft supports a circular air directing grille 17, which is longitudinally slidable on and rotatably independent of the shaft O. This grille 17 is supported for rotation on a central hub 18 mounted on the shaft O and has a concentric peripheral rim 19 between which a plurality of parallel louvers 20 are connected. The louvers 20 are arranged in groups which are disposed in different acute angles to the direction of air flow from the veins 11. The grille, including its hub, is formed as an integral plastic molding. A clutch mechanism 21 is provided to couple the output drive shaft O and the grille 17 and hub 18.

It has been found that a grille of the following construction is satisfactory: The central hub is about two inches in diameter and the rim is about 13 inches in diameter. The louvers are arranged in three groups: A first group of six louvers positioned near one section of the rim and disposed at 0° to the direction of air flow; a second group of seven louvers disposed at 15° to the direction of air flow; and a third group of six louvers disposed 30° to the direction of air flow, there being a slightly larger spacing between the groups than between adjacent louvers within the groups. The hub 18 has a forwardly projecting (away from the drive mechanisms) annular skirt 23 which extends in spaced concentric relationship around the shaft O.

The clutch mechanism 21 is best seen and described in connection with FIGS. 2-4. On the inner surface of the skirt 23 is located a pair of spaced apart pads 24 partially defining a groove 25 therebetween and formed in the body of the skirt that extends slightly beyond the ends of the pads. The skirt 23 projects forwardly from a wall 26 which carries an oppositely projecting ring 27 at its center 27 which is utilized for mounting the hub and grille. The mounting ring 27 houses a porous sleeve bearing 28 which supports the rotating grille assembly on the shaft O, which extends from the output side of the gear box G (FIG. 1). The pads 24 and the groove 25 are located on the inner surface of the skirt 23 adjacent the wall 26, thus positioning them inwardly of the skirt enclosure. As will be more fully described hereinafter, in the illustrated embodiment additional pairs of spaced apart pads 24 and grooves 25 therebetween are provided.

An annular molding 30 having a form depicted in FIGS. 2-4 is provided. This molding includes a set screw 32 having a head 34 with a serrated perimeter as shown. This head 34 affords secure positioning of the set screw when the head is molded in with the molding 30 and makes the screw an integral part of the molding.

A tapped hole 36 is provided in the end of the drive shaft O and is adapted to receive the threaded shank of the screw 32. When the molding 30 with the integral screw 32 is screwed into the tapped hole 36, the molding 30 becomes a driving member that rotates with the drive shaft O. The molding 30 is adapted to fit and rotate within the skirt 23 of the hub 18.

The hub 18 of the grille 17 is mounted for rotation on the end of the shaft O by means of the sleeve bearing 28. Such mounting allows the grille 17 to both rotate independently of the shaft O and slide longitudinally thereon. The grille 17 is removable for cleaning purposes by unscrewing the molding 30 and screw 32 and removing the grille from the shaft O.

A disk spring 38 is provided to mount on the screw 32 at the end of the shaft O, and this disk spring forms a generally radial means of interconnecting the driving member or molding 30 with the driven member or hub 18 and grille 17. This disk spring 38 is preferably of the over-the-center, snap-action type and is best seen in FIG. 2. Three radially inwardly extending fingers 40 project inwardly toward the center and fall just short of meeting. The inner ends of these three fingers define the hub of the disk. The body of the disk spring includes a generally annular portion 42 having a structure similar to a Belleville washer. Three prongs 44 project radially outwardly from the annular portion 42 opposite the fingers 40. The prongs 44 each include a notched tip 46.

A lug 48 is provided in a raised manner to project generally at right angles from one side of a portion of the disk spring 38. In the illustrated embodiment, a raised lug 48 is provided along each of the three prongs and extends from an integral association with one corresponding side edge of each prong.

The disk spring 38 is a generally elastic element being made preferably of a tempered steel and having a configuration illustrated whereby the three raised lugs 48 and 120° apart. This spring is capable of "oil canning" or snapping into shape above or below a center line, as best illustrated in FIGS. 3 and 4. The grille 17 is axially movable on the shaft O from the position shown in FIG. 3, at which driving of the grille will be effected as described hereinafter, to the position shown in FIG. 4, at which driving is prevented. The movement between the driving and non-driving positions is effected by pushing inwardly or pulling outwardly on the hub 18 to bring the rim 19 of the grille into engagement with an annular portion 50 of the casing 1 while disengaging the coupling that drives the grille or removing the rim 19 from engagement with the annular portion 50 while coupling the grille drive, respectively. (FIGS. 1 and 2.)

It can be seen that the hub of the disk spring 38 which is mounted at the end of the shaft O on the screw 32 is secured axially of the shaft O at this position. The hub thus becomes a pivot or center point and the disk spring 38 "oil cans" on either side of this center point by the aforedescribed axial movement of the hub 18. The prongs 44 extend radially to where the notched tips 46 engage the grooves 25 in an interlocked fashion. This interlock occurs by the combination of the wider prongs 44 acting against the ends of the pads 24 while the notched tips 46 extend into the grooves 25 formed in the inner surface of the wall of the skirt 23 as best seen in FIGS. 3 and 4. Thus, when the hub 18 is pushed toward the drive shaft O, the engagement with the tips 46 moves the spring over center to the position shown in FIG. 4, and vice versa by action of the pads 24 on the prongs 44 when the hub is pulled outwardly (FIG. 3).

The inner surface of the molding 30 is provided with one or more detents 52 to receive the lugs 48 when the hub 18 is pulled outwardly, i.e., placed in the drive position. In the illustrated embodiment, the detents 52 are provided in the form of radially extending slots on the inner surface of the molding 30. Six such as provided at 60° intervals. Other forms of detent, of course, could be provided. Thus, when the hub 18 is pulled out to engage the driving of the grille in revolving or rotary motion, the force of the spring bears the lugs against the detents to couple the driving member 30 with the hub 18 through the interlocked tips 46, as illustrated in FIG. 3. This coupling is disengaged when the hub 18 is pushed in, as illustrated in FIG. 4.

The surface of each lug 48 is angularly faced to provide a cam action between the lug and the detent. Thus, should the grille 17 be restrained from rotation by an obstruction to the grille, which might, for example, be caused by interference with the fan by a user, the elasticity of the disk spring 38 and the angularly facing surface of the lug 48 will allow slip of the engagement of the lug with the detent and permit the rotary drive member 30 to rotate independently of and without imparting rotational movement to the driven member (the hub 18). The driving lugs 48 will simply slip out of the detents 52 and "click" around these until the restraining force is removed and normal drive is returned. The stiffness of the disk spring 38 should be such that a user's finger inserted in the grille 17 should stop the movement of the grille to thus prevent injury. Preferably, the construction of the lugs and the relation of them to the detents is such that the lugs will cam out of engagement with the detents no matter in which rotative direction the force of camming is applied. Thus, if an outside force, such as a user forceably rotating the grille by hand in either direction, is applied on the grille and hub that would otherwise tend to either oppose the rotation of the drive shaft O or to overdrive the shaft, the lugs will simply cam out of engagement with the detents and allow the shaft O to continue its drive without overloading the motor or otherwise harming the apparatus or personnel.

In this construction, the passage of air through the grille 17 imparts rotational energy to the grille such that the grille has a tendency to rotate faster than the shaft O, even at low fan blade speeds. Thus, during the operation of this device, engagement of the lugs 48 with the detents 52 will restrain the grille and only permit it to rotate in unison with the driving member 30 and the shaft O. In this connection, it has been mentioned that the shaft O is the output shaft of the reduction gear arrangement G and thus will rotate at a speed slower from that of the motor speed and shaft 13. One satisfactory speed for the output shaft O, and, hence, the rotation of the grille 17, is 6 rpm.

If a continuous air stream is required in one area, the grille 17 is pushed in to disengage the clutch mechanism to the arrangement shown in FIG. 4. The stiffness of the spring 38 forces the grille 17 to bear against the annular portion 50 of the casing. The lugs 48 are completely disengaged in this arrangement from the detents 52, and so there is freedom for the driving member 30 to rotate without causing rotation of the grille 17. By virtue of the pressure from the spring 38, however, the contact of the grille 17 with the fan casing is adequate to prevent free rotation of the grille that could be caused by the air flow through its louvers. Also, since the grille is now free of driving forces it may be manually placed in any desired angular position for a constant direction of air flow.

It has been mentioned that the clutch as described should be allowed to slip in the event the grille 17 has an outside force acting upon it that tends to either counter or augment the drive shaft O. Although this primarily is for personnel safety, this is also desirable because the gear reduction of the driving motor gear box (G) combination results in a large torque which could otherwise damage the plastic grille 17 if the clutch were not permitted to slip when needful.

In use, the helical air flow from the fan blades F passes through the veins 11 and is thereby rendered more axial or "straightened." The air then passes through and is deflected by the grille louvers 20. If the grille 17 has been pulled into the drive position, the rotating grille will direct the air in a distribution pattern substantially the same as that of a gyratory head fan. The only substantial difference in the air flow produced is that it is more laminar or axial rather than helical as is known gyratory head fans. This is believed to be an advantage rather than a disadvantage.

Using the particular louver arrangement as hereinbefore described, the air flow pattern produced has been charted in a standard test, and it has been found that the area covered is slightly larger diameter than that of an equivalent gyratory head fan. The air flow pattern includes a central region of the total area covered in which the air is moving at all times.

There has been provided in accordance with the described invention a fan including a fan blade assembly, an electric motor for driving the fan blade assembly, means to render the air flow from the fan blade assembly more axial, an air directing grille mounted in the path of the air flow from the fan blade assembly and a clutch mechanism operable to couple a drive output off the motor and a coaxially mounted driven member supporting the grille for rotating the grille at a speed less than the fan blade assembly speed. The grille includes a plurality of louvers arranged to direct the air flow in a substantially gyratory distribution manner, and the clutch mechanism includes a driving member mounted on the drive output in addition to the driven member. The driven member is rotatably independent of the drive member. The clutch further includes singular elastic means extending generally radially intermediate the drive member and the driven member engaging both with a force adequate to transfer driving force therebetween and rotate the members together. The elastic means has provision to slip the engagement and to permit the rotary drive member to rotate independently of the driven member when either a predetermined restraint of rotation is applied to the driven member or an external driving force is applied to the driven member that would otherwise tend to either oppose or overdrive the driving member.

While the invention has been described in connection with a preferred embodiment, many alternatives, modifications, and variations may be apparent to those skilled in the art in view of the foregoing description. Accordingly, it is intended to embrace all such alternatives, modifications, and variations as fall within the spirit and scope of the appended claims.

What is claimed is:

1. A clutch mechanism comprising a rotary drive member connected to a drive shaft, a driven member being coaxially mounted on said drive shaft and rotatably independent thereof, and singular elastic means extending generally radially around the central axis intermediate said drive member and said driven member and engaging both so as to transfer driving force therebetween and rotate said members together, said elastic means having cam means to slip the engagement and to permit said rotary drive member to rotate without imparting rotational movement to said driven member when a predetermined restraint of rotation is applied to said driven member.

2. A clutch mechanism in accordance with claim 1 wherein said driven member is longitudinally slidable on said drive shaft and said clutch is capable of alternatively causing engagement and disengagement of said drive member and said driven member by axial movement of the driven member on said drive shaft.

3. A clutch mechanism in accordance with claim 2 wherein said elastic means intermediate said drive member and said driven member comprises a disk spring having its hub mounted at a fixed location axially with respect to said drive shaft and rotatably independent thereof and including on its outer periphery a prong disposed in engaging relation with a groove of said driven member, and wherein said cam means includes an intermediate raised lug on said disk spring for engaging a detent of said driving member, said disk spring being further in the form of an over-the-center, snap-action type whereby when the spring is on one side of center, the raised lug engages the detent of the driving member with a force adequate to transfer rotational movement to said driven member and when the spring is on the other side of center, the raised lug is disengaged from the detent and the driving member is free to rotate without transmitting rotational motion to said driven member.

4. A clutch mechanism in accordance with claim 3 wherein said raised lug includes an angularly facing surface whereby in combination with the elasticity of the spring and lug, the lug will cam out of engagement with the detent so as to allow the driving member to continue to rotate independently of said driven member when either a predetermined restraint of rotation is applied to said driven member or an external driving force is applied to said member that would otherwise tend to either oppose or overdrive said driving member.

5. A fan comprising a casing; a fan blade assembly mounted within said casing; an electric motor having an output shaft mounting and driving said fan blade assembly; means associated with the output of said motor providing a reduced speed output shaft; a driving member mounted for rotation with the reduced speed output shaft; a driven member coaxially mounted on and rotatably independent of the reduced speed output shaft; a clutch mechanism operable to couple said driving member and said driven member; means to render the air flow from the fan blade assembly more axial; and an air directing grille mounted in the path of air flow from said fan blade assembly and said axial rendering air flow means, said grille being supported on said driven member for rotation therewith and including a plurality of louvers arranged to direct the air flow in a substantially gyratory distribution pattern, said clutch mechanism including singular elastic means extending generally radially around the central axis intermediate said drive member and said driven member and engaging both with a force adequate to transfer driving force therebetween and rotate said members together, said elastic means having cam means to slip the engagement and to permit said rotary drive member to rotate independently of said driven member when either a predetermined restraint of rotation is applied to said grille and driven member or an external driving force is applied to the grille that would otherwise tend to either oppose or overdrive said driving member.

6. A fan in accordance with claim 5 wherein said elastic means comprises a disk spring having its hub mounted at a fixed location axially with respect to said drive shaft and rotatably independent thereof and including on its outer periphery a prong disposed in engaging relation with a groove of said driven member, and wherein said cam means includes an intermediate raised lug on said disk spring for engaging a detent driving member, said disk spring being further in the form of an over-the-center, snap-action type whereby when the spring is on one side of center, the raised lug engages the detent of the driving member with a force adequate to transfer rotational movement to said driven member and when the spring is on the other side of center, the raised lug is disengaged from the detent and the driving member is free to rotate without transmitting rotational motion to said driven member and grille.

7. A fan in accordance with claim 6 wherein said grille by its mounting hub is movable axially of said drive output shaft and moves said spring from one side of center to the other in corresponding alternate axial movements of the hub and wherein said casing has an annular portion which is engageable by an outer annular portion of said grille upon axial movement of the hub in the direction that moves the spring over center to that position at which the raised lug is disengaged from the detent of said driving member, such spring position thereby causing the grille to bear against and maintain contact with the annular portion of the casing, whereby the grille is disengaged by the rotary drive and is locked in position without switching off said motor.

8. A fan in accordance with claim 6 wherein said raised lug includes an angularly facing surface whereby in combination with the elasticity of the spring and lug, the lug will cam out of engagement with the detent so as to allow the driving member to continue rotating independently of said driven member when either a predetermined restraint of rotation is applied to said grille and driven member or an external driving force is applied to the grille that would otherwise tend to either oppose or overdrive said driving member.

* * * * *